United States Patent
Weller-Brophy et al.

(10) Patent No.: US 7,249,853 B2
(45) Date of Patent: Jul. 31, 2007

(54) UNPOLISHED OPTICAL ELEMENT WITH PERIODIC SURFACE ROUGHNESS

(75) Inventors: Laura A. Weller-Brophy, Pittsford, NY (US); Jayson J. Nelson, Webster, NY (US); Marek W. Kowarz, Henrietta, NY (US); John C. Brazas, Hilton, NY (US); James G. Phalen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 307 days.

(21) Appl. No.: 11/105,766

(22) Filed: Apr. 13, 2005

(65) Prior Publication Data

US 2006/0232748 A1    Oct. 19, 2006

(51) Int. Cl.
*G03B 21/14* (2006.01)
*G02B 5/18* (2006.01)

(52) U.S. Cl. .................. 353/20; 353/122; 359/569

(58) Field of Classification Search .......... 353/30, 353/38, 122; 359/565–566, 569
See application file for complete search history.

(56) References Cited

U.S. PATENT DOCUMENTS

| | | | |
|---|---|---|---|
| 3,728,014 A * | 4/1973 | Rosenblum | 353/38 |
| 5,311,360 A | 5/1994 | Bloom et al. | 359/572 |
| 5,754,342 A * | 5/1998 | Ohnishi et al. | 359/569 |
| 6,055,105 A | 4/2000 | Boku et al. | 359/566 |
| 6,118,594 A | 9/2000 | Maruyama et al. | 359/719 |
| 6,304,381 B1* | 10/2001 | Hayashi | 359/495 |
| 6,307,663 B1 | 10/2001 | Kowarz | 359/231 |
| 6,411,425 B1 | 6/2002 | Kowarz et al. | 359/291 |
| 6,515,955 B2 | 2/2003 | Takeuchi | 369/112.08 |
| 6,545,807 B2 | 4/2003 | Maruyama | 359/565 |
| 6,930,760 B2* | 8/2005 | Van Elp et al. | 355/67 |
| 2005/0286570 A1* | 12/2005 | Xiang | 372/20 |

* cited by examiner

*Primary Examiner*—Christopher Mahoney
(74) *Attorney, Agent, or Firm*—Stephen H. Shaw

(57) ABSTRACT

An optical sub-system has an optical element having a curved surface featured with a plurality of recurring surface tooling marks. The depth of any surface tooling mark is less than 0.2 wavelengths, whereby light is diffracted on the curved surface. A spatial filter blocks the diffracted light and passes the undiffracted light.

27 Claims, 17 Drawing Sheets

UNPOLISHED OPTICAL ELEMENT WITH PERIODIC SURFACE ROUGHNESS

FIELD OF THE INVENTION

The invention relates generally to optical components, and in particular to the methods of fabricating optical elements such as lenses and mirrors and the resulting optical elements fabricated using these methods. More specifically, the invention relates to a process for fabricating an aspheric lens wherein mid- to high-spatial frequency cutting marks are retained in the lens or lens molding tool without adverse impact upon the final performance of the lens in the optical system.

BACKGROUND OF THE INVENTION

Projection, printing, and scanning systems often require the formation of a light distribution that is uniform along a line or over an area. As is well known to those skilled in the optical arts, such a uniform light distribution may be formed via an optical system that comprises lenses that are acylindric (a term used for cylindrical lenses that are aspheric) or other aspherical glass or plastic optical elements.

Traditional grinding and polishing or glass molding processes are well suited for forming conventional lens shapes, such as spherical optical surfaces, radially symmetric aspheres, and flat surfaces. These lens fabrication processes typically yield surface roughness on the order of about 0.7 nm RMS. Traditional grinding and polishing procedures are also used for mold preparation, yielding glass-molded or plastic-molded parts that exhibit surface roughness in the same overall range. However, less conventional shapes, such as acylindric shapes, are not as easily fabricated using these traditional grinding and polishing or molding processes.

Eliminating or minimizing surface defects of optical components is considered to be of critical importance for many types of imaging and laser applications. Lens surface features generated by cutter marks are classified as mid-spatial frequency errors due to their relative size and pitch, and are acknowledged as a significant problem source for UV, visible, and IR applications. Propagation of wavefront errors due to mid-spatial frequency effects can cause unacceptable intensity modulations, even creating potentially damaging hot spots in the beam path for some types of optical systems. Errors at these frequencies can degrade beam quality beyond acceptability in many types of applications and may even lead to catastrophic system failure in extreme cases.

Chief among the problems caused by surface roughness of a lens element or a mirror is unwanted diffraction of light from an unpolished surface. Diffracted orders of light scattered by roughness at the surface interfere with each other as they propagate, forming undesired structures in the light intensity. Because of such effects, an unpolished lens or mirror having periodic surface roughness may be unacceptable for conventional optical applications.

As is well known to those skilled in optical fabrication, polishing and finishing techniques for acylindric lenses are considerably more challenging than the techniques required for finishing rotationally symmetric surfaces. Providing precision molded acylindric surfaces with a 0.7 nm RMS roughness typically requires one or more iterative processes. For example, a precision acylindric mold can be fabricated for initial molding of acylindric structures. The acylindric mold is then polished to form the molded element as a finishing step; this final polishing step is generally performed by hand, by a skilled master optician. As is well known to those skilled in optical fabrication, polishing procedures used to achieve the required surface characteristics must be executed with extreme care, lest the original acylindric shape itself be lost. Moreover, any tooling used to figure the acylindric shape may leave process-induced roughness in the optical component. Similar difficulties arise whether the lens is ground and polished in glass, or molded, or fabricated using a combination of molding, figuring, and finishing techniques. Even where satisfactory surface smoothness is achieved, these fabrication complications can cause an optical component to be prohibitively expensive, especially for apparatus in a prototype stage.

Conventional lens polishing and finishing techniques, used for spherical and plano surfaces, have been successfully adapted for some types of basic non-axisymmetric shapes such as prisms and cylindrical shapes. However, complex acylindric shapes have proved more difficult to polish, particularly for smaller optical components. Thus, it can be appreciated that there is a need for optical design techniques that enable the effective use of acylindric components and other irregular lens structures, without restrictions imposed by the inherent limitations of conventional lens polishing. There is also a need for methods that allow lower cost fabrication of aspherical and other optical elements, particularly for prototyping and low-volume applications.

SUMMARY OF THE INVENTION

The present invention is directed to apparatus and methods utilizing acylindrical and other non-axisymmetric lenses, as well as axisymmetric aspherical lenses and other optical elements that have not been precisely polished to remove tooling marks. The present invention provides an optical sub-system, comprising:

a) an optical element having a curved surface for differentiating light featured with a plurality of recurring surface tooling marks, wherein the depth of any surface tooling mark is less than 0.2 wavelengths; and b) a spatial filter for blocking the diffracted light and passing undiffracted light.

ADVANTAGEOUS EFFECT OF THE INVENTION

The present invention involves a simplified manufacturing process that is estimated to provide savings on the order of more than 75% on the cost of ground and polished precision glass aspheres as well as similar savings on the cost of low volumes of molded glass or plastic optics. The present invention allows a diffraction-limited optical system to be assembled that includes lens or mirror components that have not been polished in a conventional manner.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
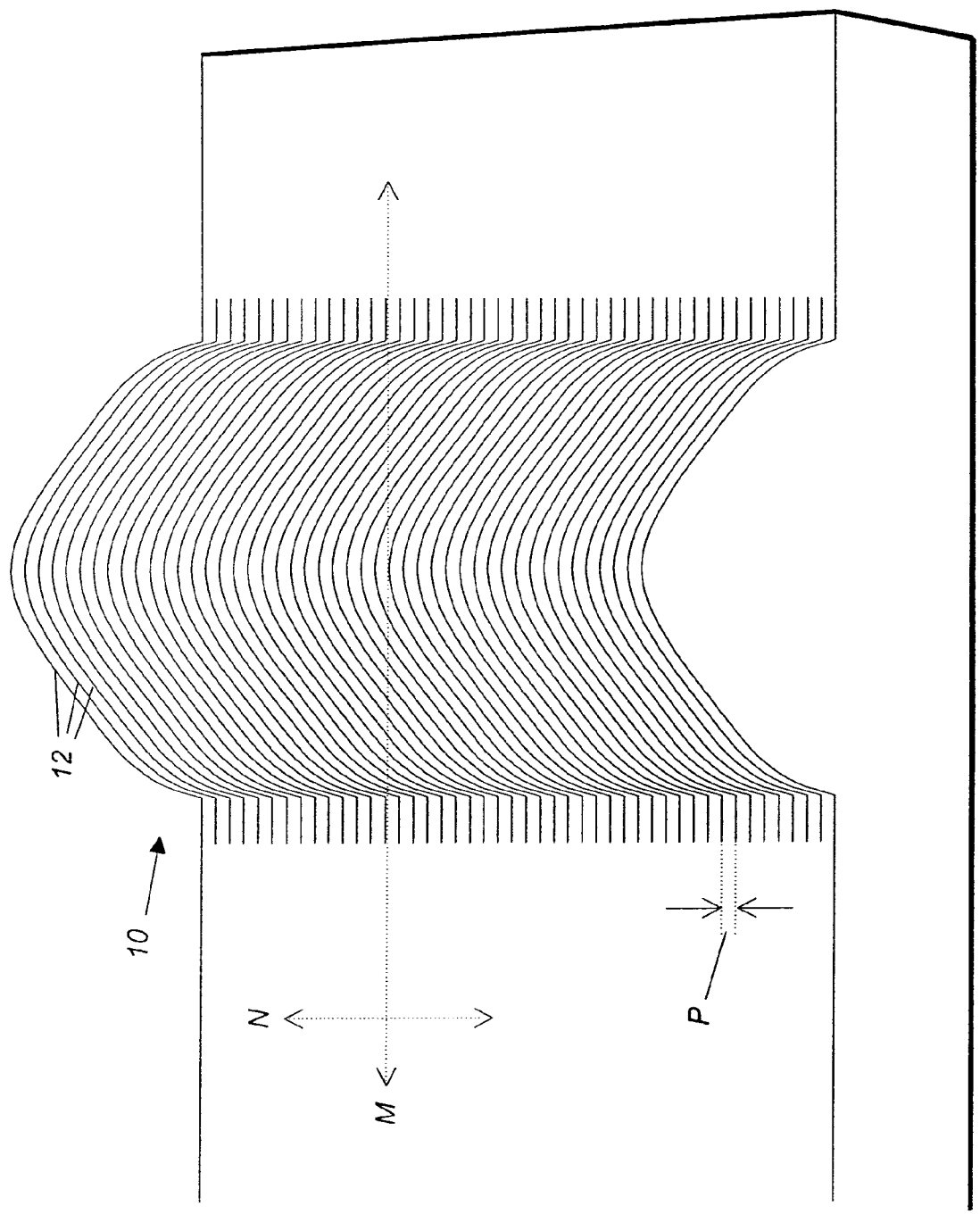
FIG. 1 is a perspective view showing the arrangement of tooling cuts in a mold for lens fabrication in one embodiment.

The present description is directed in particular to elements forming part of, or cooperating more directly with, apparatus in accordance with the invention. It is to be understood that elements not specifically shown or described may take various forms well known to those skilled in the art.

As was noted in the background section above, conventional lens fabrication practices require that surface roughness of a molded or tooled lens be treated to provide a finished, smooth surface for light refraction. In contrast to conventional practice, the method of the present invention allows the use of unpolished lenses in illumination apparatus, compensating for periodic surface roughness elsewhere in the optical path by blocking diffracted orders from light that has been transmitted through the unpolished surface.

The description that follows is primarily directed to apparatus and method embodiments wherein a lens is the unpolished component having periodic surface roughness. In an alternative embodiment, the unpolished component could be a mirror, as is described subsequently.

It is well known that high-frequency surface structure such as a diffraction surface can be formed on the surface of a spherical lens to generate a hybrid refractive-diffractive surface. Such refractive-diffractive lenses enable unique optical designs that are difficult to implement with purely refractive lens elements. Recently, a number of designs have been proposed that contain lenses having an aspheric surface that is also diffractive. See, for example, U.S. Pat. No. 6,055,105, entitled "Optical System with Grating Element and Imaging Device using the Same," issued on Apr. 25, 2000 to K. Boku and S. Ono; U.S. Pat. No. 6,118,594, entitled "Objective Lens for Optical Pick-Up", issued on Sep. 12, 2000 to K. Maruyama; U.S. Pat. No. 6,515,955, entitled "Objective Optical System for Optical Pick-Up", issued on Feb. 4, 2003 to S. Takeuchi; and U.S. Pat. No. 6,545,807, entitled "Refractive-Diffractive Hybrid Lens", issued on Apr. 8, 2003 to K. Maruyama. In each of these disclosures, a high-frequency surface structure is deliberately formed on a curved spherical or aspherical surface. This surface structure significantly changes the optical performance of a refractive optical component by providing diffraction without requiring the use of a separate diffractive optical component.

It is instructive to emphasize an important principle: diffractive lenses and gratings are generally designed to shift most of the optical energy from the undiffracted (zeroth order) light to one or more diffracted orders (that is, non-zero orders). Thus, for example, the diffractive surfaces disclosed in patents cited above (Boku et al. '105, Maruyama '807 and '594, and Takeuchi '807) all operate to provide constructive interference that directs a substantial portion of light energy into desired diffracted orders.

The deliberate formation of a diffractive surface for providing constructive interference, as indicated in the above-cited patent disclosures, requires high-frequency surface features such as grooves or indentations in order to form the diffraction surface. In most cases, these added features have an amplitude that approximates the size of one wavelength. For an idea of relative scale and range, conventional refractive-diffractive lenses and conventional diffractive lenses employ surface features whose size ranges from a significant fraction of the wavelength, nominally greater than about 0.2 wavelengths in amplitude, to a few wavelengths in amplitude. The dimensions of a diffraction surface or any type of diffraction grating must be in this range in order to provide the intended optical energy distribution, that is, in order to direct a significant portion of the optical energy into one or more diffracted orders.

By comparison to diffractive surface features or structures, recurring tooling marks that result from the lens or molding tool fabrication process may cause some small amount of diffraction. However, such tooling marks do not have sufficient amplitude or suitable spacing dimensions to act similarly to diffractive surface features, nor do they direct any significant amount of light energy into diffractive orders. Additionally, as described below, recurring tooling marks direct small amounts of light energy into diffractive orders which are subsequently blocked from the desired optical path. Unlike the diffractive optics described in the above-cited patent disclosures, the optics with tooling marks described herein do not diffract light into the desired optical path.

It is important, then, to distinguish a diffraction surface from a surface that is coarsely roughened by tooling marks. The grooves formed by conventional tooling are significantly shallower than would be required for diffractive surface fabrication, with amplitudes typically below 0.1 wavelength, normally ranging from about 0.01 wavelength to no more than about 0.1 wavelength.

Thus, it can be seen that while surface roughness effectively forms features on the unpolished lens that invariably cause some amount of diffraction as an unintended consequence, these features would not be suitably sized or arranged to form a usable diffraction surface. Instead, any diffraction inevitably caused by tooling marks has undesirable effects on the light that is refracted by the lens element. The tooling mark surface features need not be periodic (that is, with a pitch P equal across the lens) but can be considered as recurring, with pitch P varying as needed for tooling accuracy.

The teaching of the present invention takes a different approach from the conventional surface treatment methods used to minimize or eliminate tooling marks and thereby minimize or eliminate unwanted diffraction effects in the optical path. In one embodiment, a method of the present invention provides an illumination apparatus having an acylindric lens that need not be polished to remove tooling marks. The present invention provides particular advantages with acylindric lenses, since conventional polishing methods are particularly difficult to apply successfully to such non-axisymmetric surfaces, especially where lenses are small in scale. Thus, the present invention eliminates the expense and complexity of polishing small acylindric lenses, or other aspheric lenses, in many applications where such expense and complexity has heretofore prevented the widespread use of such optical components in lower cost illumination apparatus. Significantly, the described embodiments of the present invention allow a diffraction-limited optical system to be fabricated without the cost and complexity of conventional finishing techniques.

Fabrication of the Lens Mold

In order to better appreciate the exemplary embodiments of the present invention, it is instructive to review how a mold for an acylindric lens, or other non-axisymmetric lens type, is formed. The following discussion is not meant to be limiting, as additional methods are well known to those skilled in the art, where a variety of tooling processes are known for the molding of both glass and plastic optics. A glass molding tool is typically fabricated using a raster cut approach, with the acylindric profile, or other suitable profile, contour ground.

As part of this contour grinding process, the grinding wheel makes an initial cut to form a basic acylindric profile. In the subsequent grinding cycle, the grinding wheel cuts and is repeatedly step-indexed, in the non-power direction of the lens, thus making each subsequent cut adjacent and generally parallel to the previous cut. This process repeats across the entire tool surface until the mold structure is fabricated.

Referring to FIG. 1, there is shown (in one embodiment), by way of example, an arrangement of parallel cuts 12 made in a glass molding tool 10 in one embodiment, for fabricating an acylindric lens. (The shape of parallel cuts 12 is extremely exaggerated in FIG. 1 in order to better describe their structural characteristics.) As shown in FIG. 1, the power direction M of the acylindric lens lies along cuts 12, generally parallel to cuts 12; the non-power direction N of the lens is orthogonal to the direction of cuts 12. It can be appreciated that the resultant molded surface will evidence discontinuities in the non-power direction equivalent to the pitch P used in the raster cutting process. However, as was emphasized in the background material given above, it is difficult to polish anacylindric lens accurately to eliminate these discontinuities, without risking loss of lens shape.

In practice, the spatial period of the raster-cut surface roughness, pitch P in FIG. 1, can range from less than 10 microns to more than 1 mm. As is explained subsequently, the pitch P should be small enough to allow separation of undiffracted (zeroth order) light from residual diffracted light.

Following grinding procedures that form glass molding tool 10, the molding tool surface can be characterized and checked using a variety of contacting and non-contacting methods. A three-dimensional surface structure can be obtained via raster scanning, for example, by using a profilometer.

Lens Molding and Preparation

Prior to use for molding lenses, the molding tool 10 is treated with an appropriate release coating to be used for the manufacture of glass or plastic articles. The molding tool 10 is typically used with an appropriately shaped glass, or plastic perform, or gob to mold the finished acylindric lens. The resulting molded lens element, when released from the molding tool 10, has surface features corresponding to cuts 12 in the molding tool 10.

In conventional practice for the molding of a glass lens, the lens that is removed from the molding tool 10 would be polished to remove any unwanted surface features. However, the present invention departs from conventional practice and uses the unpolished, molded lens in an optical apparatus for providing linear illumination, providing compensation for undesirable diffractive effects of the rough lens surface elsewhere in the optical system, as described in the following section.

Linear Illumination Apparatus

Figure 2:
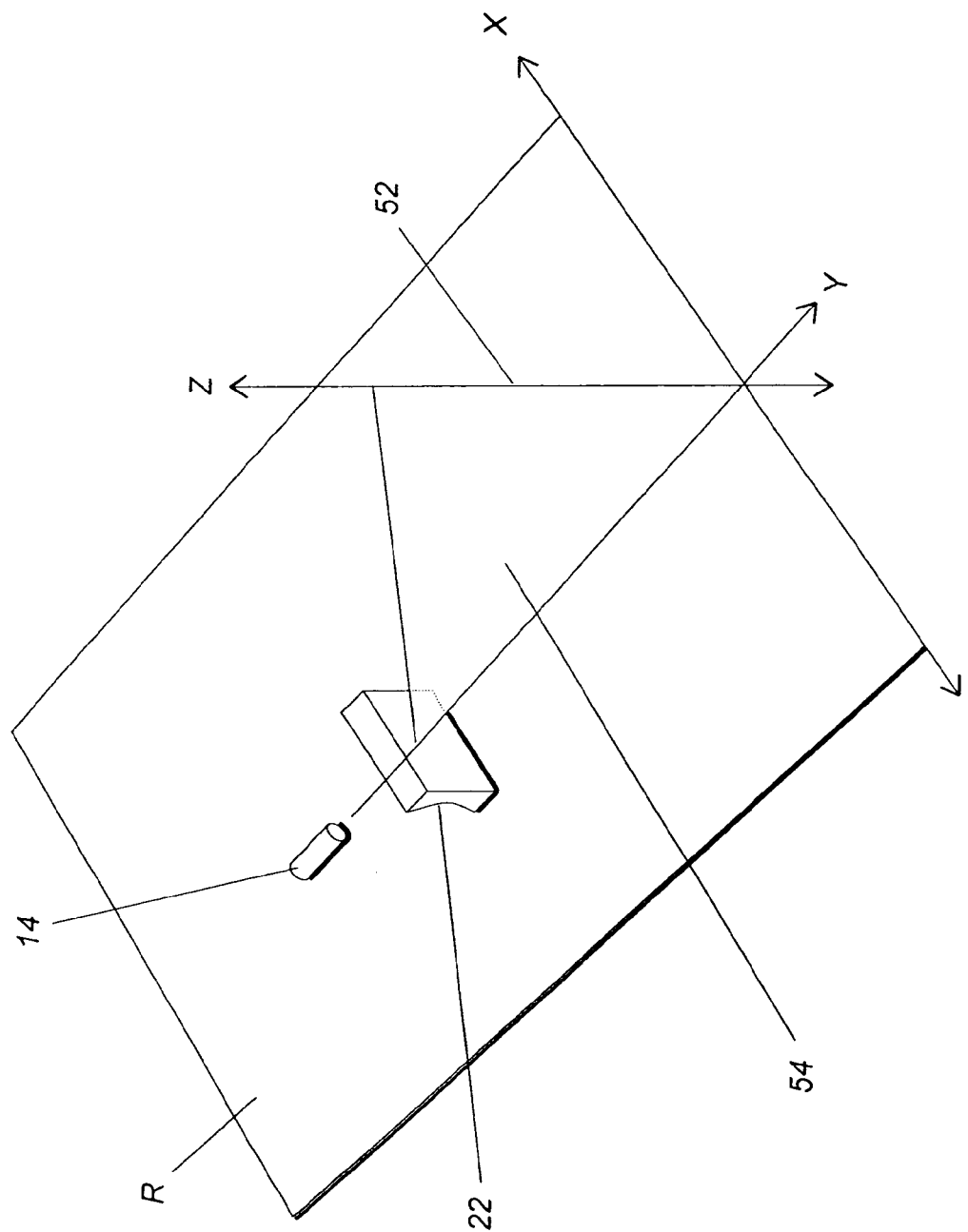
FIG. 2 shows the idealized behavior of an acylindric lens for shaping a uniform line of light from an incident beam.

Referring to FIG. 2, there is shown, in a perspective view and exaggerated for the purpose of description, an idealized illumination apparatus 50 that provides, from a light source 14, a uniform line of light 52 that serves as an illumination beam. In one embodiment, light source 14 is a laser. A reference plane R is shown for the purpose of description; uniform line of light 52 is orthogonal to reference plane R. An acylindric lens 22 shapes the input light beam so that it fans outward in its power direction, that is, along the z axis in the coordinate system shown in FIG. 2. The fan of light providing line of light 52 is a linearly spread beam 54 and shaded for clarity. In the coordinate system of FIG. 2, linearly spread beam 54 is orthogonal to reference plane R. To a first approximation, with acylindric lens 22 perfectly formed and finished, all of the light from the incident light beam is directed outward from acylindric lens 22 in linearly spread beam 54.

Figure 3:
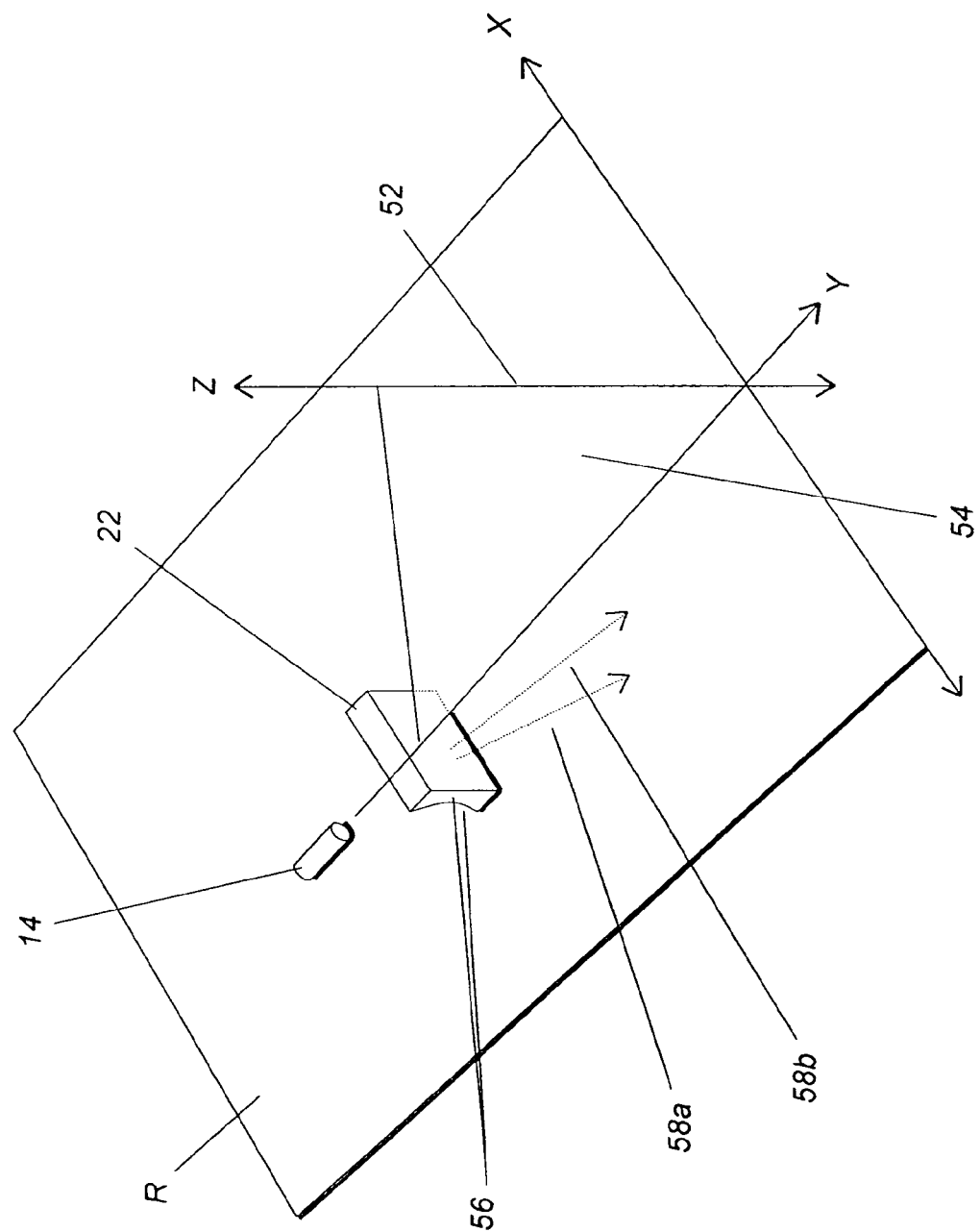
FIG. 3 shows the effects of diffraction from tooling mark surface structures on the acylindric lens.

By comparison with the idealized behavior shown in FIG. 2, FIG. 3 shows the undesirable effect of tooling marks 56 on the light that is output from acylindric lens 22. Unwanted diffracted orders 58a and 58b, shown by dotted lines in FIG. 3, are directed away from linearly spread beam 54, so that this stray light is not utilized in forming line of light 52. Diffracted orders 58a and 58b of this stray light are diverted from the intended light path represented as linearly spread beam 54, at various angles. Tooling marks 56 on one surface of acylindric lens 22, replicated from cuts 12 in molding tool 10 (FIG. 1), cause periodic surface roughness. Diffracted orders 58a and 58b are obtained from the periodic surface roughness on acylindric lens 22. The diffraction angle produced by pitch P of tooling marks 56 must be large enough to allow separation of primary undiffracted (zeroth order) light from residual diffracted orders 58a and 58b. Pitch P is, therefore, selected to be small enough to permit this separation without making the tool fabrication time unreasonably long.

Figure 4:
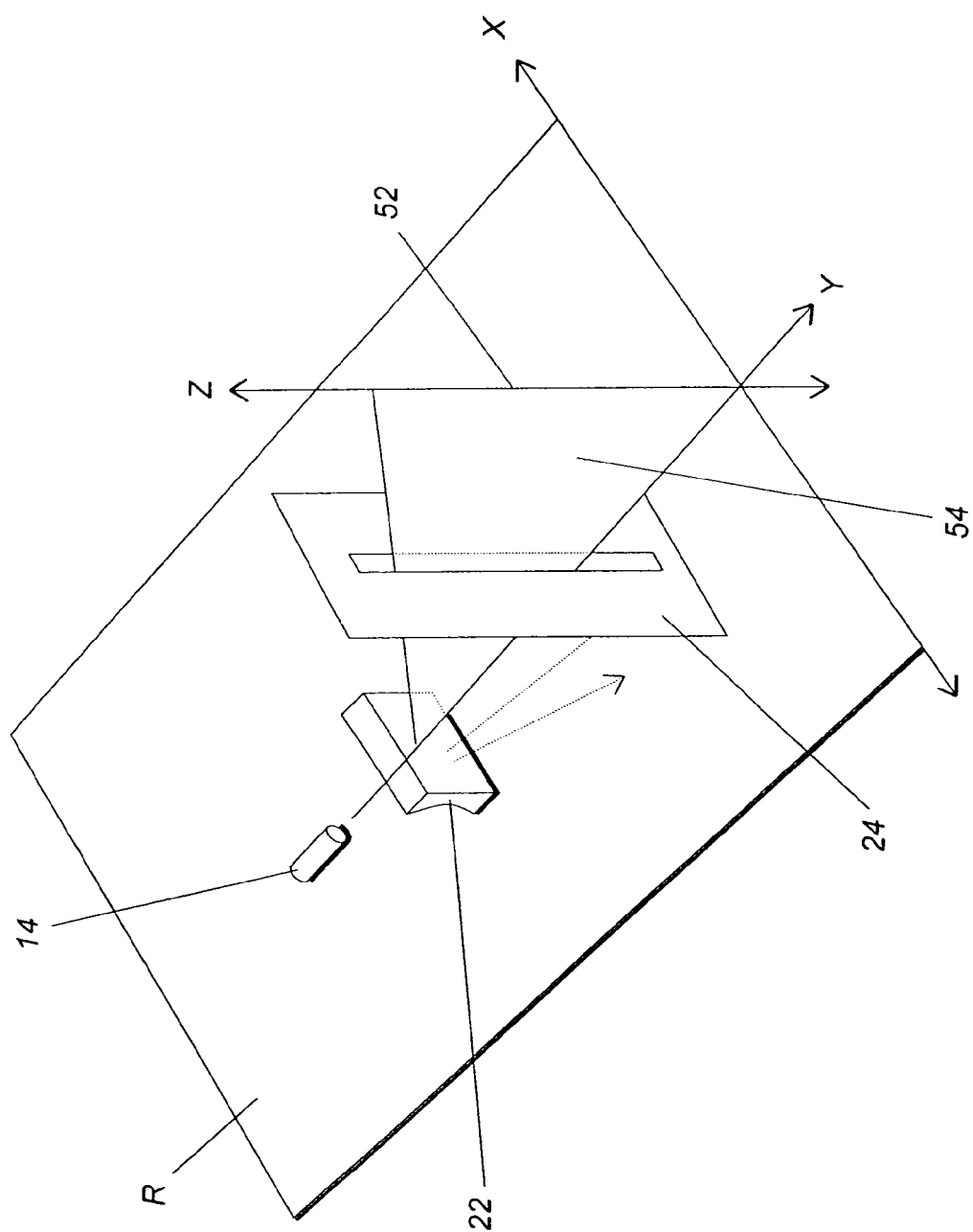
FIG. 4 shows the technique of the present invention for blocking diffracted orders from the light path.

FIG. 4 shows how the method of the present invention corrects for diffraction. A slit aperture 24 is positioned as a type of spatial filter, transmitting undiffracted linearly spread beam 54 and blocking unwanted diffracted orders 58a and 58b. Only the undiffracted zeroth order light is retained in the optical path. Line of light 52 is thus provided for use by other components in the optical path.

Figure 5:
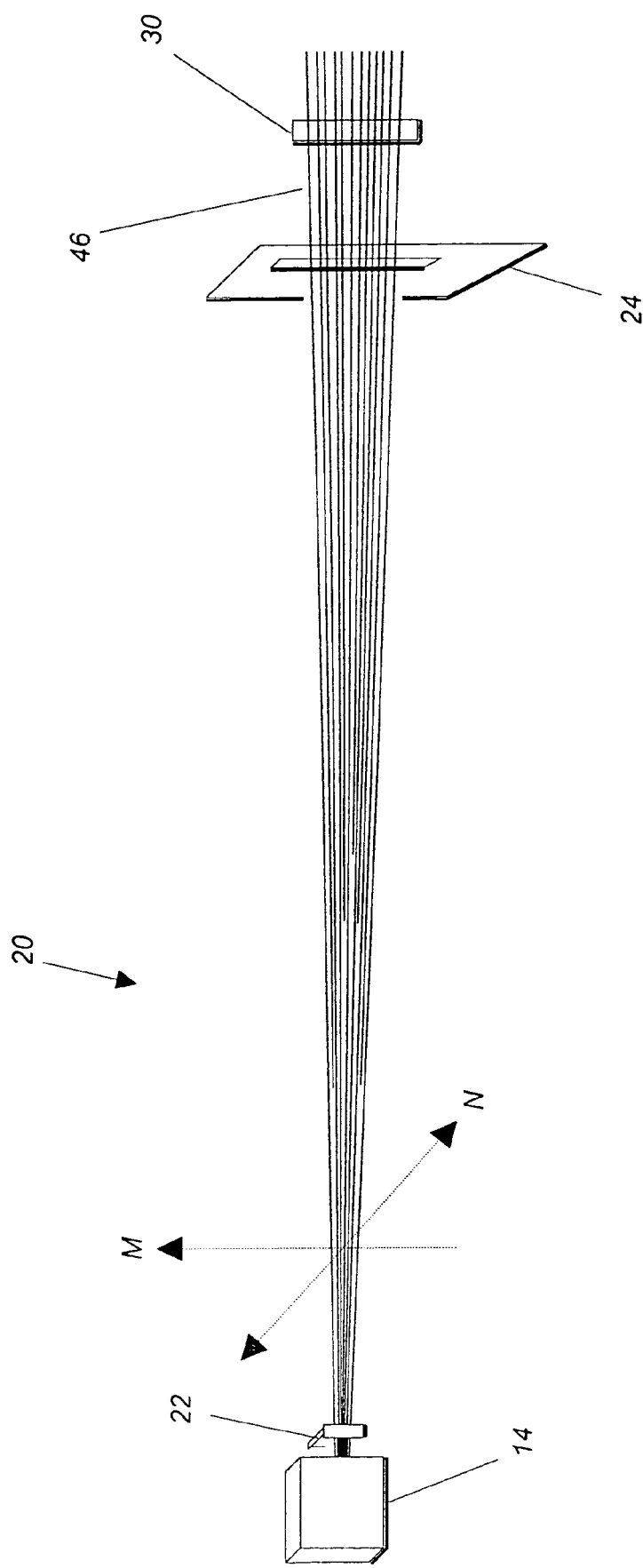
FIG. 5 is a block diagram showing an illumination apparatus in one embodiment.
Figure 6:
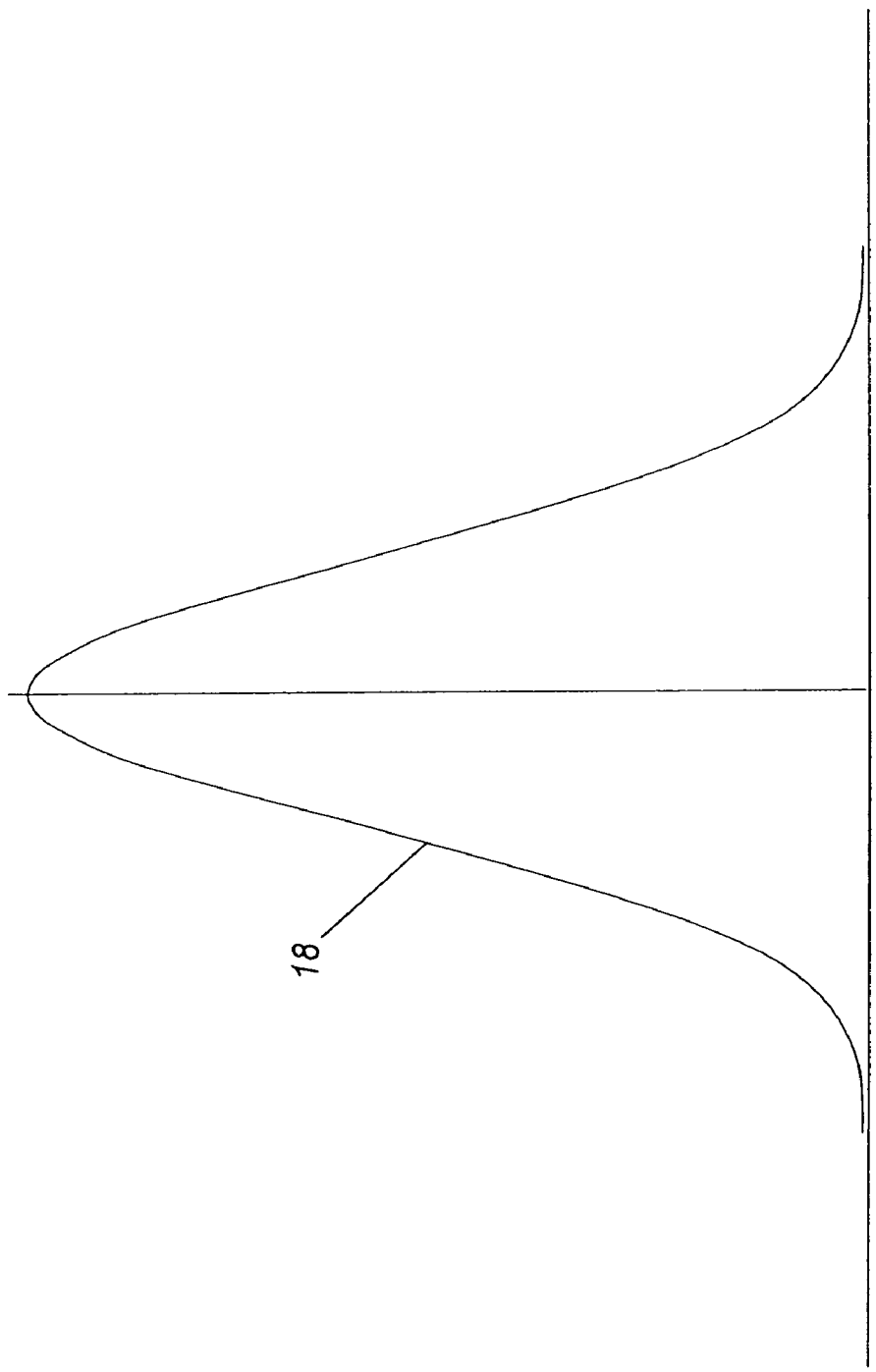
FIG. 6 is a graph showing the characteristic intensity of a light source.

Referring to FIG. 5, an illumination apparatus 20 according to the present invention is shown in a side view relative to the power direction M. Here, illumination apparatus 20 accepts a Gaussian input beam from light source 14 and conditions the light through acylindric lens 22 and slit aperture 24. In one embodiment, light source 14 is a laser diode that provides a Gaussian input beam. FIG. 6 shows a curve 18 representing the Gaussian input beam profile. Acylindric lens 22 is an unpolished, molded lens, fabricated as described above; that is, as was noted with reference to FIG. 3, acylindric lens 22 has tooling marks 56 resulting from the impressions due to cuts 12 in the mold, as shown in FIG. 1. The power M of acylindric lens 22 is in the plane of the page. Acylindric lens 22 spreads the incident beam from light source 14 along a line parallel to the page in the view of FIG. 5. Slit aperture 24 is extended along the length of the page in this view and blocks one or more diffracted orders of light from the output of acylindric lens 22.

Figure 7:
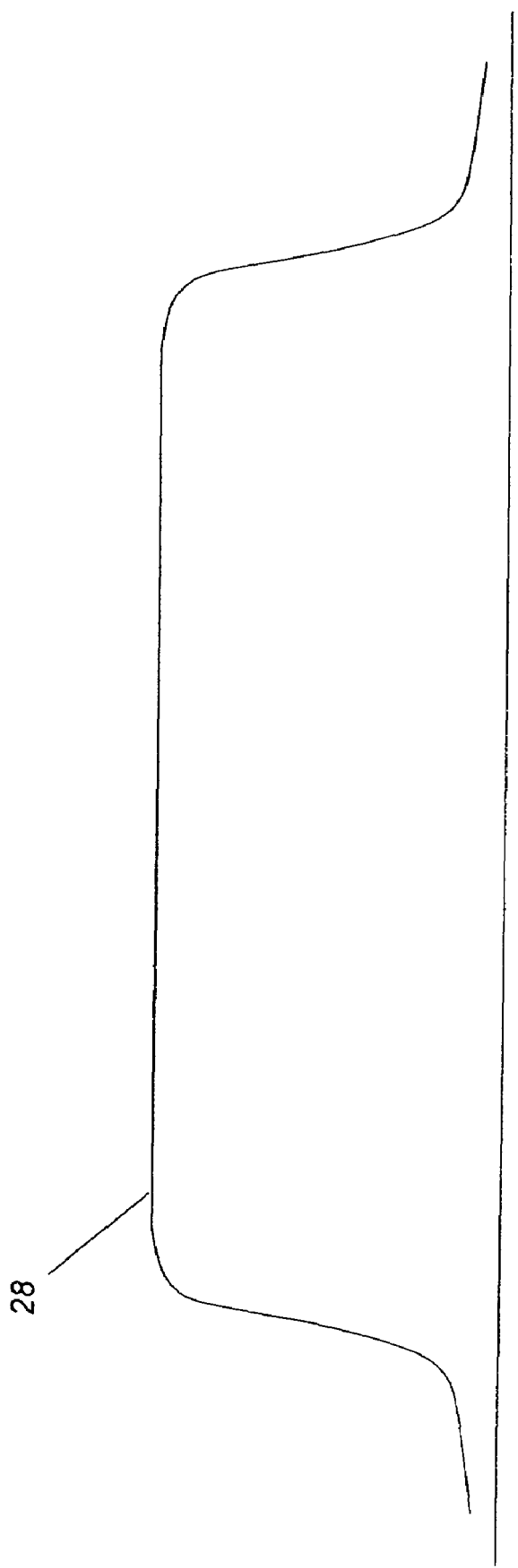
FIG. 7 is a graph showing the preferred intensity of output light from the illumination apparatus of one embodiment.

Referring back to FIG. 5, light traveling through slit aperture 24 then goes as an illumination beam 46 to a linear modulation device 30. Linear modulation device 30 could be, for example, a Grating Light Valve (GLV) linear array, as described in U.S. Pat. No. 5,311,360 (Bloom et al.) or an electromechanical conformal grating device, termed a GEMS device, consisting of ribbon elements suspended above a substrate by a periodic sequence of intermediate supports, as disclosed by Kowarz in commonly assigned U.S. Pat. No. 6,307,663, issued on Oct. 23, 2001, entitled "Spatial Light Modulator With Conformal Grating Device." FIG. 7 shows the output of illumination apparatus 20 as an output beam curve 28.

Using slit aperture 24, unwanted diffracted orders of light are absorbed or reflected and not passed through to the remainder of the optical system. The beam passing through slit aperture 24 should, preferably, behave like a diffraction limited Gaussian beam (when considered orthogonally to the line of light formed) without satellite beams, tails, or rings.

Figure 9:
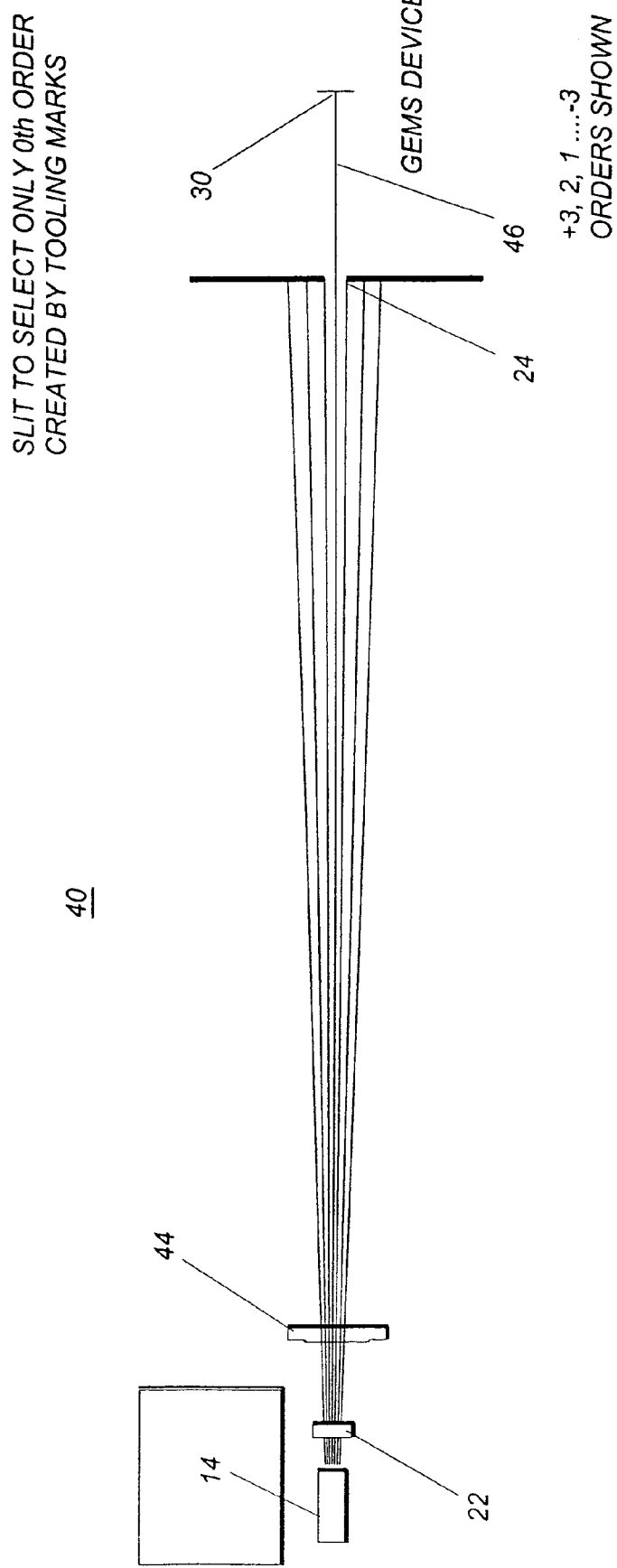
FIG. 9 is a block diagram showing an illumination apparatus in an alternative embodiment.

A focusing lens, of cylindrical shape and having curvature along direction N (FIG. 5) may additionally be positioned between light source 14 and linear modulation device 30 in order to shape the illumination beam along the narrow axis of linear modulation device 30. Referring to FIG. 9, there is shown an alternative embodiment in which an illumination apparatus 40 has such a cylindrical lens 44, acting as a focusing lens, disposed with power orthogonal to an acylindric lens 22. In the view of FIG. 9, the power of acylindric lens 22 is orthogonal to the page. The power of cylindrical lens 44 is in the plane of the page, extending vertically as viewed. With this arrangement, cylindrical lens 44 focuses the zeroth order light to yield a more intense, narrower line of light through aperture slit 24. Aperture slit 24 blocks unwanted diffracted orders. Lens 44 could be an acylindric lens in an alternative embodiment. With this alternative embodiment, both acylindric lens 22 and cylindrical lens 44 can be unpolished, yet provide a diffraction-limited optical system. It may also be possible to provide both acylindric lens 22 and cylindrical lens 44 on opposite sides of the same optical element.

Optimization

For optimization of illumination apparatus 20 or 40, the periodicity of the surface roughness from tooling marks 56 can be designed to provide the desired angular distribution and amount of diffracted light. In this way, diffracted light can be directed further from aperture slit 24, to improve the separation of this light from the zeroth order light. Roughness amplitude can be optimized to reduce the diffracted power while facilitating single pass raster cutting of the mold tool. In practice, the spatial period of the raster-cut surface roughness (corresponding to pitch P in FIG. 1) can range from less than 10 microns to more than 1 mm. To effectively separate the diffracted light from the desired undiffracted light, it is preferable to maximize the spatial frequency of the raster cut, that is, to minimize pitch P. Generally speaking, the diffracting angle must be greater than the far field diffraction angle of the Gaussian input beam. In the example of a nearly collimated 6 mm $1/e^2$ input Gaussian beam, this should not present a problem with respect to angular resolution, provided that aperture slit 24 is located sufficiently far away from lens 22. Preferably, the roughness amplitude is less a tenth of the wavelength $\lambda$ to minimize the diffracted optical power that must be absorbed outside of aperture slit 24 and thereby to maximize the amount of useful light passed through aperture slit 24 and available to other parts of an optical system.

Figure 8:
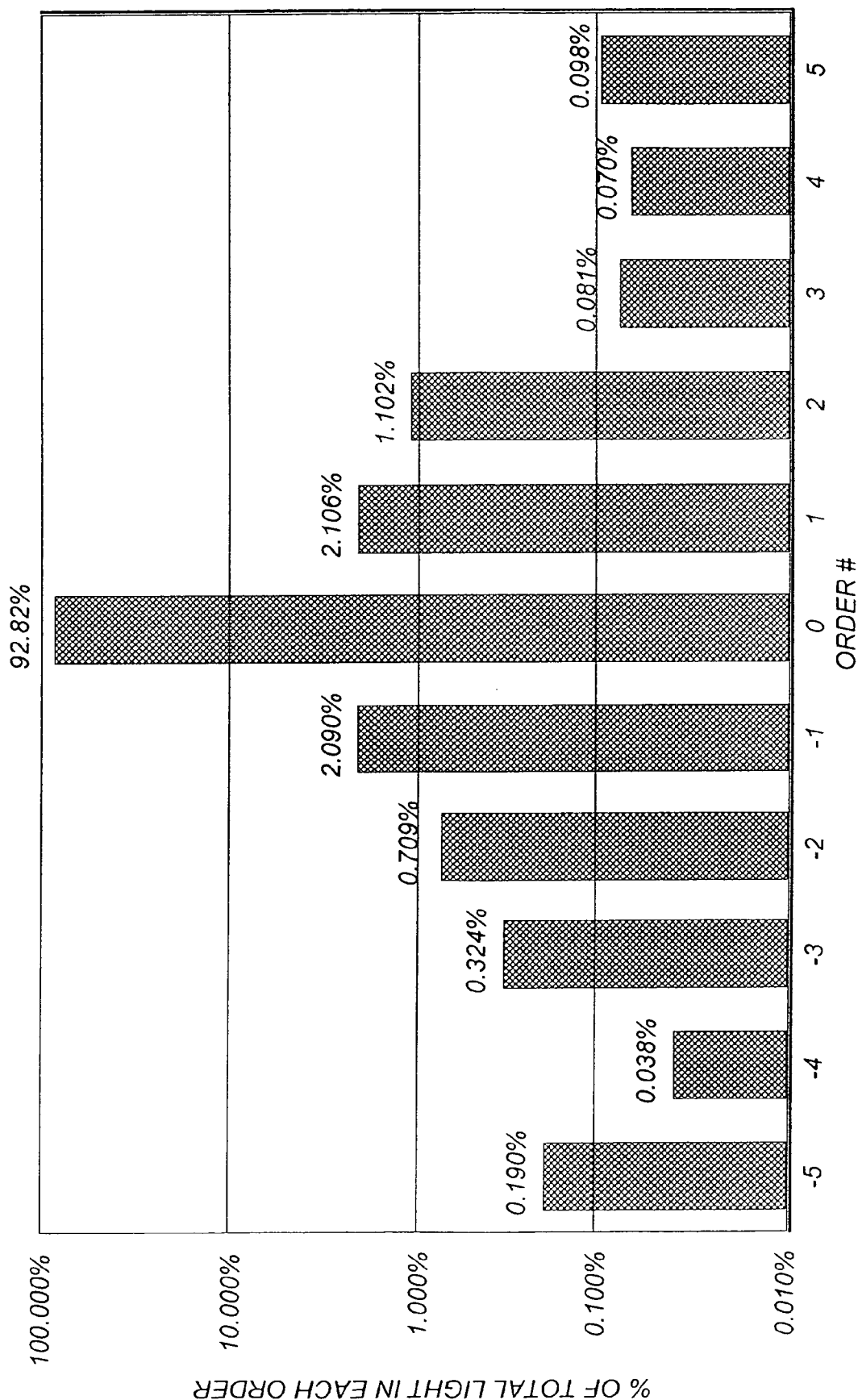
FIG. 8 is a graph showing relative power levels for various orders of output light from a lens in one embodiment.

Experimental data show that a 50 micron tooling pitch P (FIG. 1) causes diffraction of multiple orders for illumination apparatus 20. Referring to the graph of FIG. 8, showing intensity measurements from a fabricated acylindric lens, it can be seen that the majority of the optical power directed through acylindric lens 22 is contained in the (non-diffracted) zero-order. The zero-order power can be optimized through control of the amplitude roughness imparted by the cutting tool used to fashion the mold, using techniques well known in the optical fabrication arts.

Figure 10B:
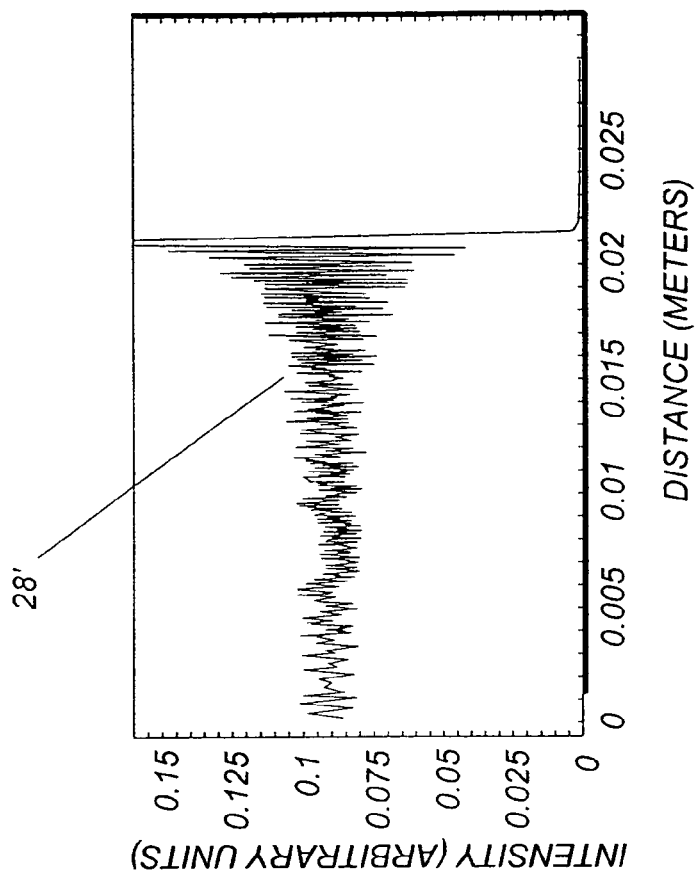
FIGS. 10A and 10B are graphs showing output light characteristics for various truncation values of an acylindric polynomial.
Figure 10A:
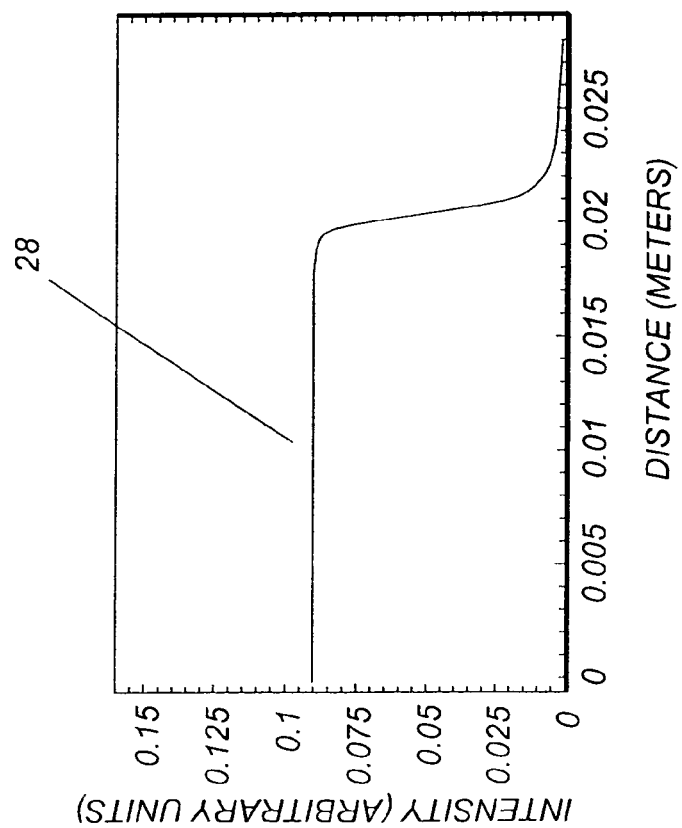
Figure 11:
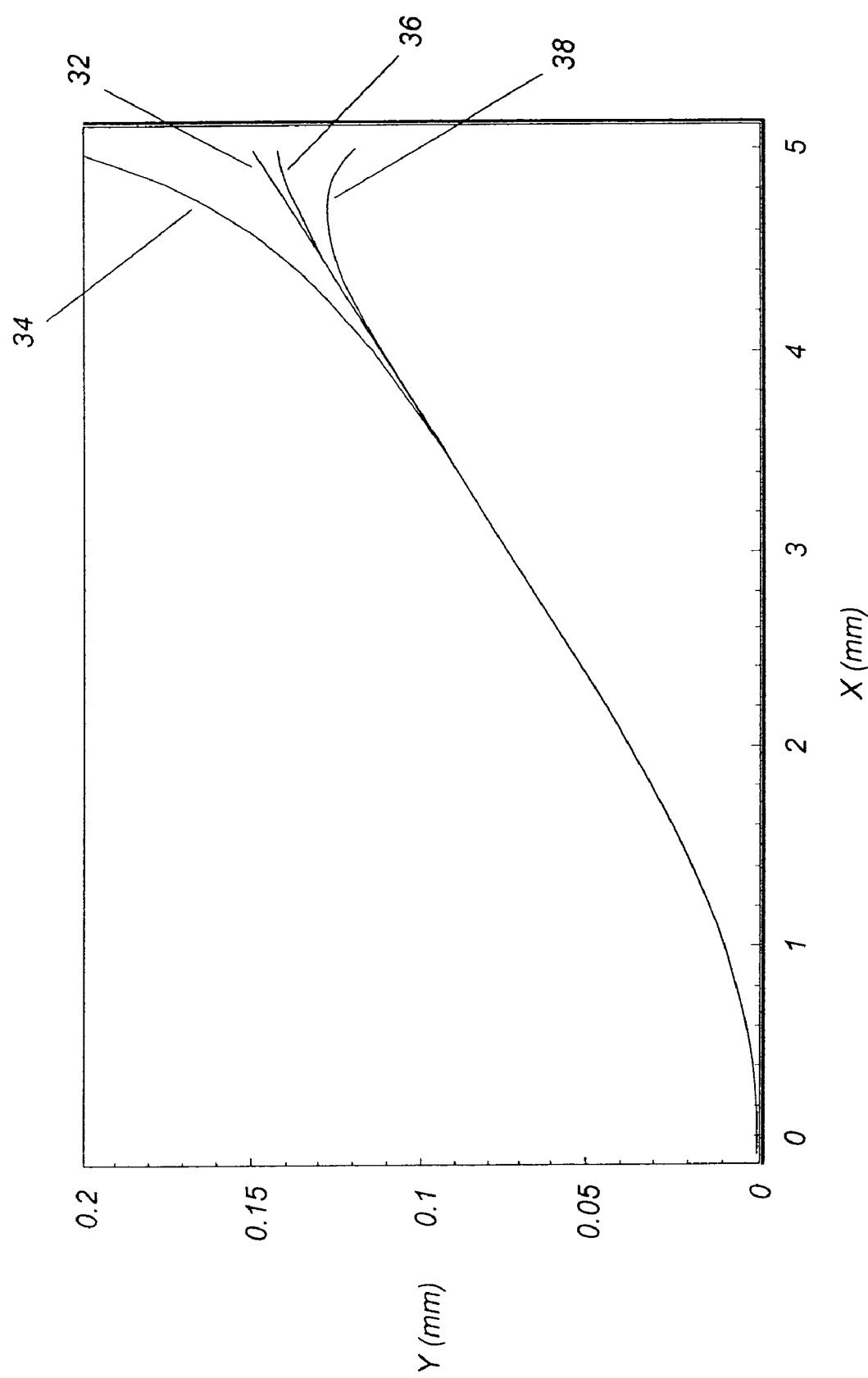
FIG. 11 is a curve showing light handling behavior for various truncation values of an acylindric polynomial.

Optimization of the shape of acylindric lens 22 may be an important factor. For acylindric lens 22 to provide the linear illumination having output characteristics shown in FIG. 7, truncation of the curvature equation at a suitable value of the series expansion has been found to have a dramatic impact on the characteristics of output curve 28. Referring to FIG. 10A, one half of output curve 28, based on a scalar diffraction model, is shown for acylindric lens 22 wherein the acylindric polynomial that describes the shape of the lens surface is truncated at the $14^{th}$ order variable. Here, output curve 28 has the preferred shape, providing a uniform output. In contrast, FIG. 10B shows a highly non-uniform output curve 28' that results when the acylindric polynomial is truncated at the $16^{th}$ order variable. The graph of FIG. 11 shows the effects of series truncation on lens shape, for different truncation levels. An exact curve 32 shows the ideal theoretical lens shape where no series truncation occurs. A curve 34 shows the effect of $14^{th}$ order truncation. Curves 36 and 38 show the effects of $20^{th}$ and $16^{th}$ order truncation, respectively. With respect to the graph of FIG. 11, curves lying on or above exact curve 32, such as curve 34 for example, correspond to acceptable performance, providing well-behaved output illumination as was shown in FIG. 10A. In FIG. 11, curves that decay with respect to exact curve 32, such as curves 36 and 38, correspond to poor performance and to highly non-uniform output illumination as was shown in FIG. 10B. It is instructive to note that the sensitivity of the surface curvature along the outer edges of acylindric lens 22 also relates to difficulties with polishing noted in the background section above; any amount of polishing is likely to adversely affect this outer edge curvature.

An example curvature polynomial for acylindric lens 22, through the 14$^{th}$ order variable, is as follows:

$$Y = \frac{cX^2}{1 + \sqrt{1 - (k+1)c^2X^2}} + dX^4 + eX^6 + fX^8 + gX^{10} + hX^{12} + iX^{14}$$

Where
c=−0.022966
k=−1
d=4.67075×10$^{-4}$
e=−2.07589×10$^{-5}$
f=8.237655×10$^{-7}$
g=−2.847584×10$^{-8}$
h=8.629044×10$^{-10}$
i=−2.317936×10$^{-11}$ X and Y are orthogonal distance values in a cross-sectional plane through the lens, parallel to the power direction.

Experience has shown that fabrication of acylindric lens 22 with truncation of the polynomial at 10th, 14th, 18th, 22nd, and subsequent orders at intervals of +4 is advantaged. Using truncation at any of these terms causes the edge of acylindric lens 22 to curve in the same direction as the curvature at the center of the lens. This truncation, then, yields favorable behavior similar to that shown in FIG. 10A. By comparison, truncation of the polynomial at 8th, 12th, 16th, 20th, 24th, and subsequent orders at intervals of +4 is disadvantageous. When truncated at any of these orders, the curvature polynomial yields a surface shape in which edges of the lens curve in a direction opposite to the curvature at the lens center. As a result, this yields the unfavorable behavior shown in FIG. 10B. Broadly stated, advantaged behavior occurs when the outer edges of acylindric lens 22 have additional power over that provided by an ideal solution. Fabrication using this advantaged curvature allows some tolerance for error in shaping acylindric lens 22.

Figure 12B:
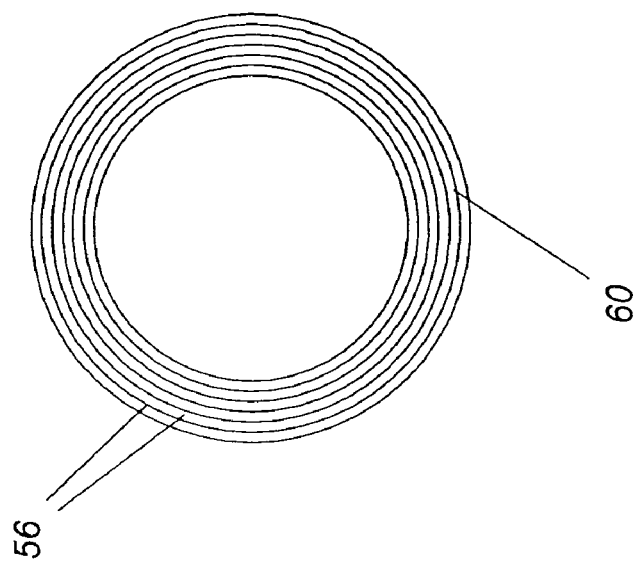
FIGS. 12A and 12B are side and front views, respectively, of an aspheric lens according to an alternative embodiment.
Figure 12A:
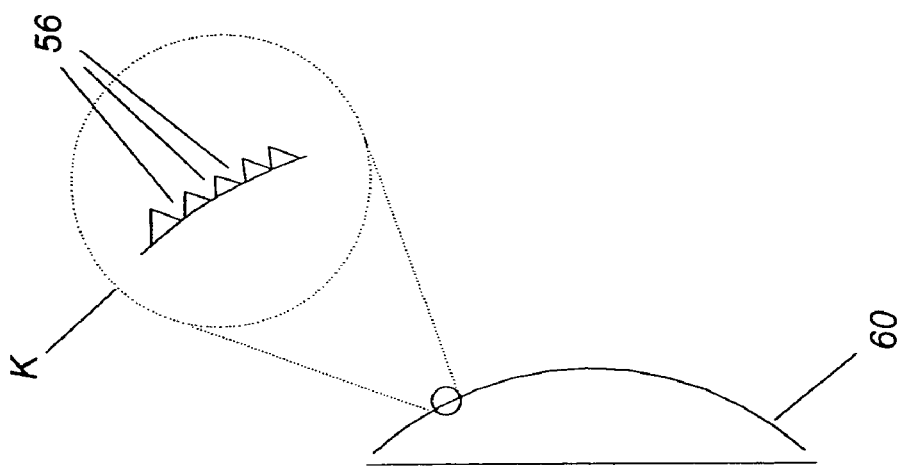
Figure 13:
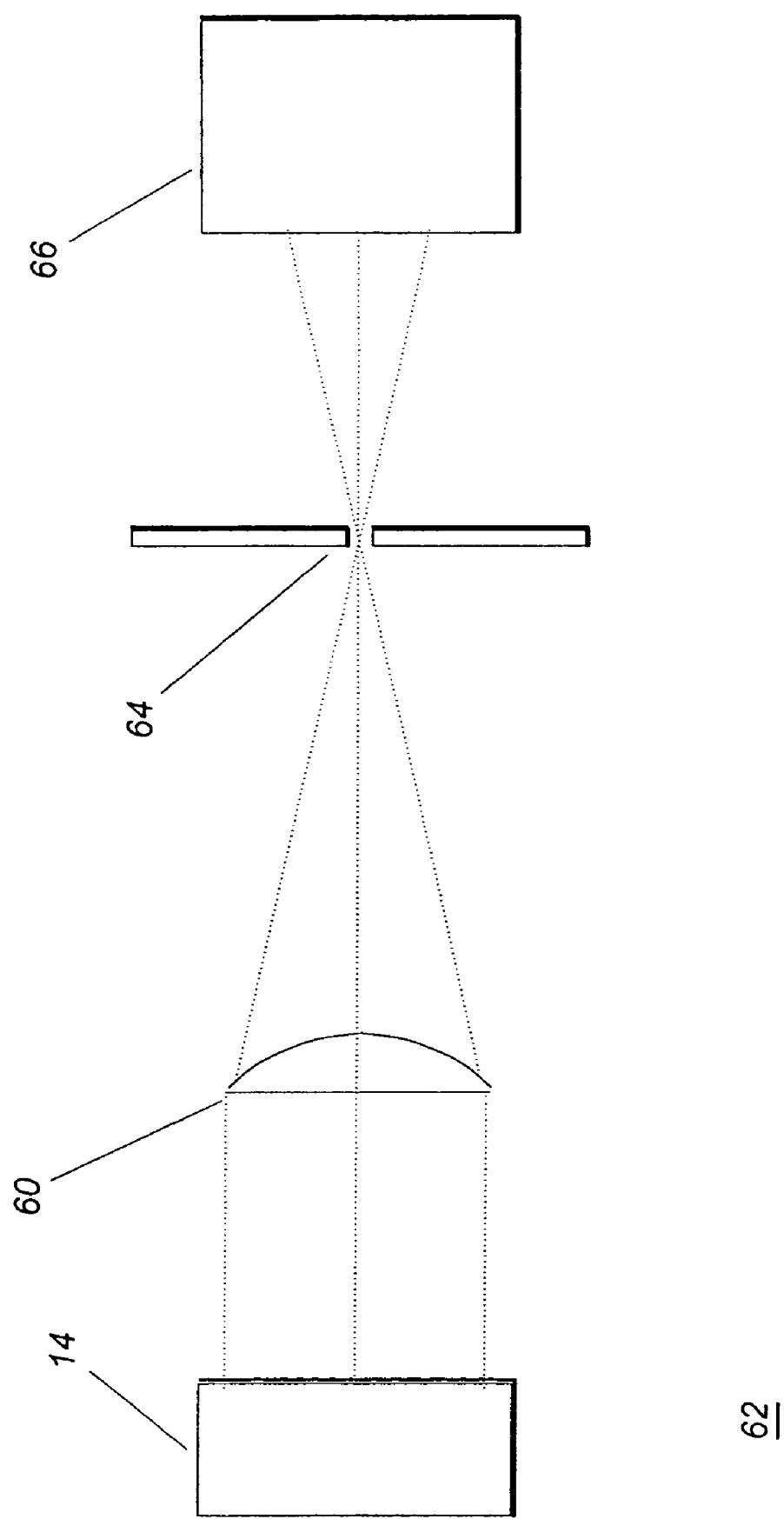
FIG. 13 is a block diagram of an illumination apparatus using the aspheric lens of FIG. 12A.

While the method of the present invention is particularly advantaged for providing an illumination beam where acylindric lenses are used in illumination apparatus, the present invention can be used for other types of lenses as well, including aspheric lenses. FIG. 12A shows a side view of an aspheric lens 60, with a highly magnified section K of the surface having tooling marks 56. FIG. 12B shows these surface features from a front view, highly exaggerated. FIG. 13 shows a block diagram of an illumination apparatus 62 using aspheric lens 60 of FIGS. 12A and 12B. Aspheric lens 60 focuses light from light source 14 through an aperture 64, which is positioned to block diffracted light caused by tooling marks 56 and to pass the zeroth order undiffracted light to an optical system 66. Aspheric lens 60 could, for example, be designed to provide uniform illumination to optical system 66. Aperture 64 must be appropriately sized and positioned, depending on curvature and tooling mark characteristics of aspheric lens 60.

The method of the present invention could alternatively be used with lenses having toric shape. A toric lens, for example, would have power along both M and N axes in FIG. 5.

Reflective Components

Figure 15:
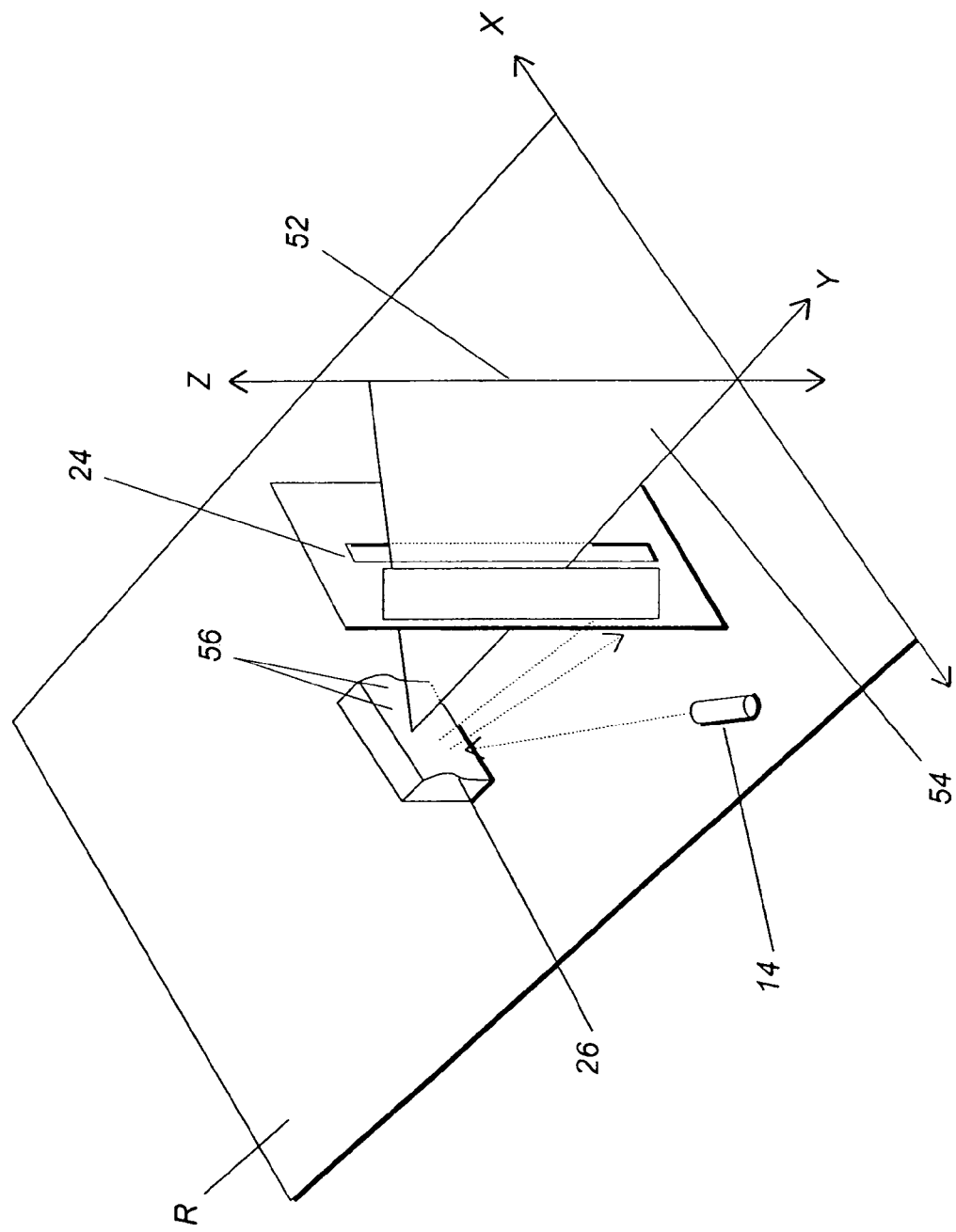
FIG. 15 is a perspective view showing an unpolished reflective element in an alternative embodiment.

As is indicated above, the method and apparatus of the present invention are directed generally to the use of unpolished optical elements, a broad category that also includes mirrors. Referring to FIG. 15, there is shown an embodiment in which an acylindric mirror 26 is used for forming line of light 52. Here, acylindric mirror 26 is formed from a mold and has replicated tooling marks 56 that cause some measure of unwanted diffraction. Aperture 24 is similarly disposed in the path of light output from acylindric mirror 26 to block unwanted diffracted orders and pass the undiffracted zeroth order light.

Image Forming Apparatus

Figure 14:
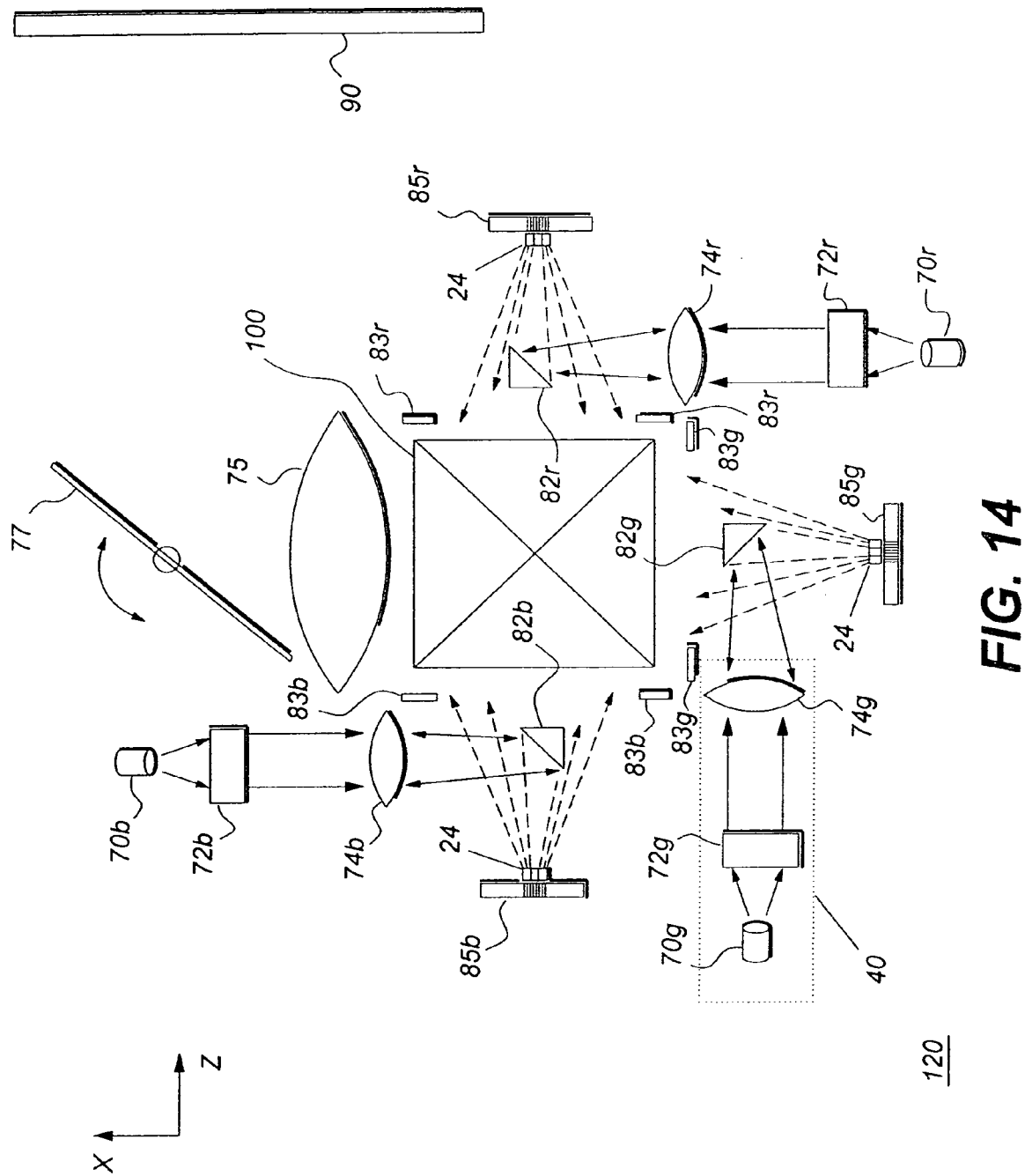
FIG. 14 is a block diagram showing an imaging apparatus using an acylindric lens according to the present invention.

FIG. 14 is a block diagram of a full-color display apparatus 120 using illumination apparatus 40 of FIG. 9 in each of its three color channels. Overall operation of display apparatus 120 is basically the same as is described in commonly assigned U.S. Pat. No. 6,411,425 entitled "Electromechanical Grating Display System with Spatially Separated Light Beams" to Kowarz, et al., incorporated herein by reference. GEMS devices are linear spatial light modulators.

Considering the green color channel for detailed description, a light source 70g, typically a laser, directs light to an acylindric lens 72g that expands the beam in the manner described with respect to acylindric lens 22 in FIGS. 2-5. A cylindrical lens 74g focuses this light toward a GEMS linear array 85g, with the light redirected by a turning mirror 82g. The power directions of acylindric lens 72g and cylindrical lens 74g are orthogonal to each other. Slit aperture 24 may be positioned in close proximity to GEMS linear array 85g, such as along the edges of the active area of the GEMS device, or, alternatively, before turning mirror 82g. In another embodiment, the function of slit aperture 24 (i.e., selecting pre-determined orders of light to pass) may be provided by turning mirror 82g. A modulated linear light is then directed, between stops 83g, through a color combining prism 100, such as an X-cube or similar color combiner component, through a projection lens 75 and a scanning component 77, typically a rotating mirror or prism, for scanned projection onto a display surface 90.

Red and blue color channels operate in similar fashion, with their respective light sources 70r, 70b; acylindric lenses 72r, 72b; cylindrical lenses 74r, 74b; linear arrays 85r, 85b; turning mirrors 82r, 82b; and stops 83r, 83b. Similarly, color combining prism 100 directs modulated light from each of the color channels toward scanning component 77.

Figure 16:
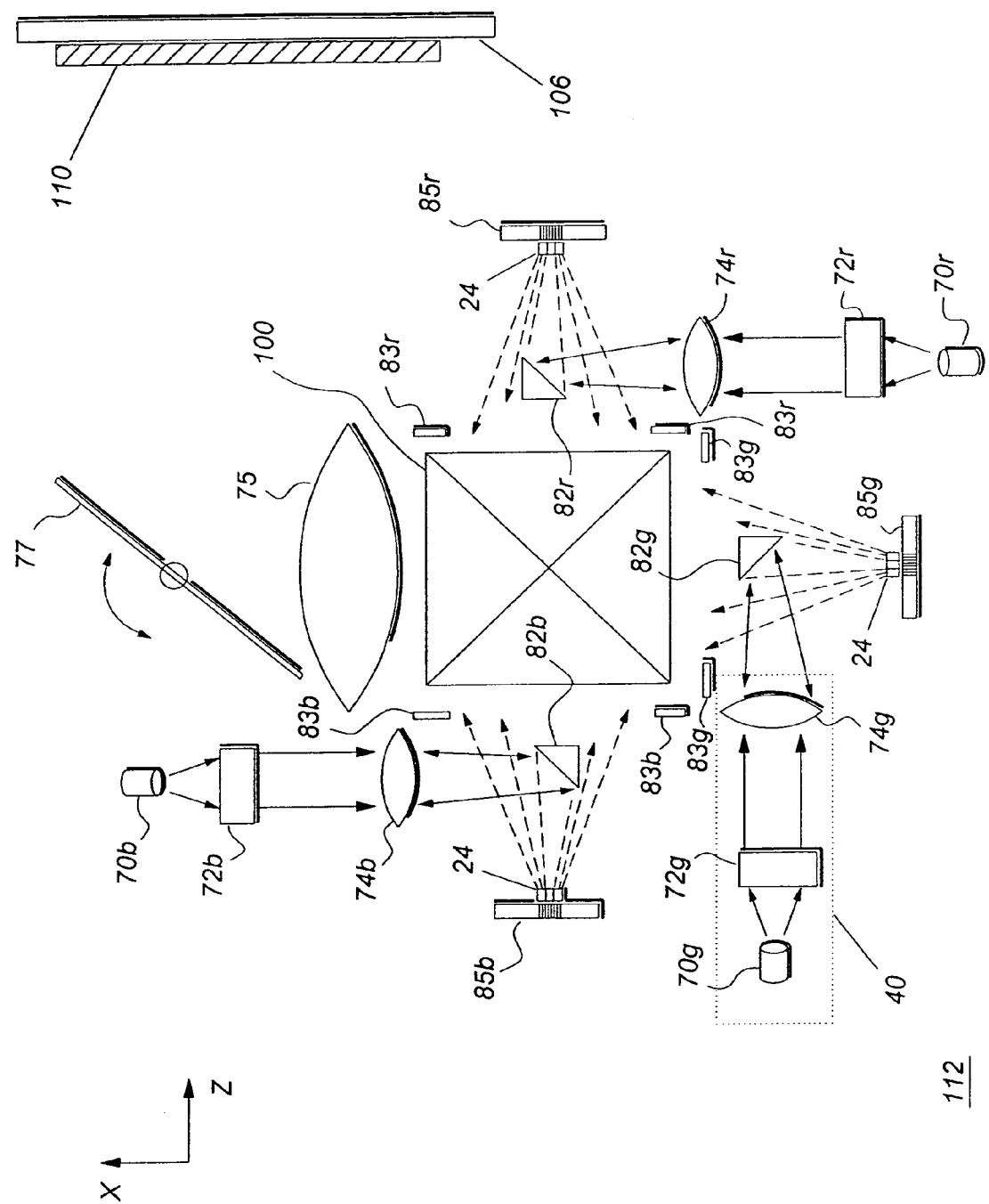
FIG. 16 is a block diagram showing a printing apparatus using the lens element of the present invention.
Figure 17:
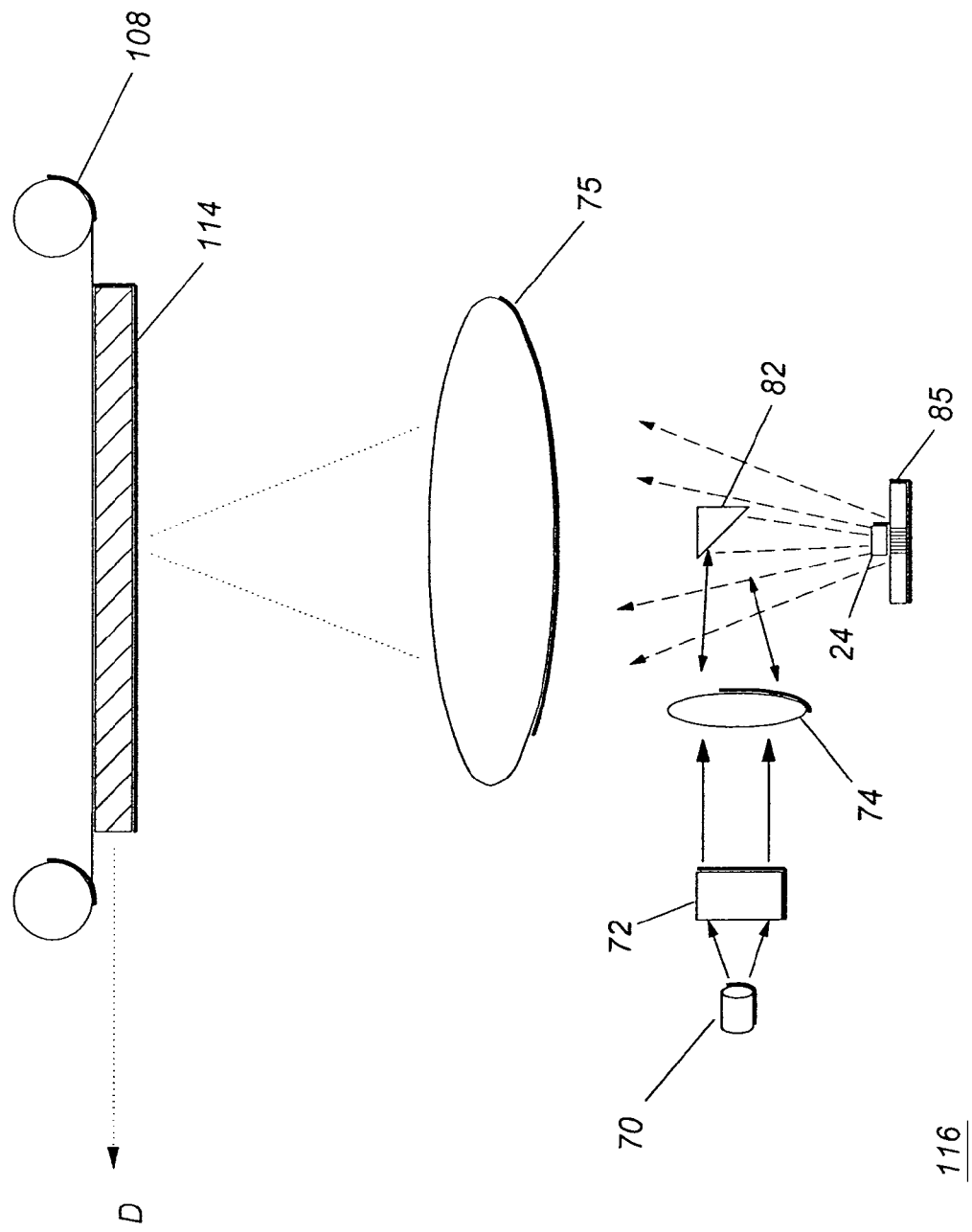
FIG. 17 is a block diagram showing an embodiment of a patterning apparatus using the lens element of the present invention.

The present invention can be used with other types of image forming apparatus in addition to the display apparatus 120 shown in FIG. 14. Referring to FIGS. 16 and 17, alternative embodiments are shown of a printing apparatus 112 and a patterning apparatus 116, respectively, for recording an image or pattern onto a recording medium 110 or 114. For example, as shown in FIG. 16, recording medium 110 could be a photosensitive medium such as a color film or other medium. In another embodiment, using the arrangement of FIG. 17, recording medium 114 could be a photoresist surface layer. In the embodiment of FIG. 16, color recording medium 110 is held in place on a platen 106 and scanning component 77 is used to successively scan lines of modulated light onto recording medium 110. Suitable light wavelengths from light sources 70r, 70g, and 70b are used to expose each color component of the recording medium 110.

In the patterning apparatus 116 of FIG. 17, a transport mechanism 108 moves recording medium 114 in the path of the modulated line of light, in a travel direction D. Patterning apparatus 116 could be a lithography imager, for example. Here, only a single light source 70 is needed to direct light to an acylindric lens 72 and to a cylindrical lens 74. The shaped linear light beam is then directed by a turning mirror 82 to a linear array 85, such as a GEMS device. The modulated output light is next directed through lens 75 onto recording medium 114. The same basic component arrangement of FIG. 17 could be used for a monochrome imaging printer, for example. Light source 70 could emit radiation at any suitable wavelength for forming the pattern onto recording medium 114, including ultraviolet UV, visible, and infrared IR, for example.

Unlike a diffraction surface that is formed on a lens surface to provide optical energy in one or more diffracted orders, as disclosed in Boku et al. '105, Maruyama '807 and '594, and Takeuchi '807 patents cited above, the tooled, unfinished surface that is used with lenses in the present invention provides the bulk of optical energy in the undiffracted zeroth order, with only a small fraction of optical energy in diffracted orders. By blocking unwanted diffracted orders from light that is refracted by these lenses, the apparatus and method of the present invention obviate the need for polishing and finishing treatments, allowing the fabrication of diffraction-limited optical systems employing lenses that would be conventionally considered as unfinished.

The invention has been described with reference to a preferred embodiment. However, it will be appreciated that variations and modifications can be effected by a person of ordinary skill in the art without departing from the scope of the invention. For example, the illumination apparatus of the present invention can be used with optical apparatuses other than a display apparatus, including scanner, printing, and patterning apparatuses. The method of the present invention can be employed with a variety of lens shapes, including acylindrical, toric, and various aspherical lens shapes and can be used with a variety of mirror shapes as well. An unfinished lens may be formed by molding processes, as is described hereinabove, or may be separately tooled, such as in a prototype application. Tooling marks would be present on the unfinished lens in either case. An apparatus using an optical element of the present invention could form a full-color image, using multiple light sources as are shown in FIGS. 14 and 16.

PARTS LIST

10 Molding tool
12 Cuts
14 Light source
18 Curve
20 Illumination apparatus
22 Acylindric lens
24 Aperture
26 Acylindric mirror
28,28' Curve
30 Linear modulation device
32 Curve
34 Curve
36 Curve
38 Curve
40 Illumination apparatus
44 Cylindrical lens
46 Illumination beam
50 Illumination apparatus
52 Line of light
54 Linearly spread beam
56 Tooling mark
58a, 58b Diffracted order
60 Aspheric lens
62 Illumination apparatus
64 Aperture
66 Optical system
70, 70r, 70g, 70b Light source; Light source, red; Light source, green; Light source, blue
72, 72r, 72g, 72b Acylindric lens; Acylindric lens, red; Acylindric lens, green; Acylindric lens, blue
74, 74r, 74g, 74b Lens
75 Lens
77 Scanning component
82, 82r, 82g, 82b Turning mirror
83r, 83g, 83b Stop
85, 85r, 85g, 85b Linear array
90 Display surface
100 Color combining prism
106 Platen
108 Transport mechanism
110, 114 Recording medium
112 Printing apparatus
116 Patterning apparatus
120 Display apparatus
D Travel direction
M Power direction
N Non-power direction
P Pitch
R Reference plane
K Section

What is claimed is:

1. An optical sub-system, comprising:
   a) an optical element having a curved surface for diffracting light featured with a plurality of recurring surface tooling marks, wherein the depth of any surface tooling mark is less than 0.2 wavelengths; and
   b) a spatial filter for blocking the diffracted light and passing undiffracted light.

2. The optical sub-system claimed in claim 1 further comprising a light source and wherein the depth of at least one surface tooling mark is greater than 0.01 $\lambda$, wherein $\lambda$ is a wavelength of light emitted from the light source.

3. The optical sub-system claimed in claim 1, wherein the curved surface is rotationally symmetric.

4. The optical sub-system claimed in claim 1, wherein the recurring surface tooling marks are periodic.

5. The optical sub-system claimed in claim 1 further comprising a light source and wherein the depth of each surface tooling mark is less than 0.1 $\lambda$, wherein $\lambda$ is a wavelength of light emitted from the light source.

6. The optical sub-system claimed in claim 1, wherein the plurality of surface tooling marks are replicated from a mold.

7. The optical sub-system claimed in claim 1, wherein the optical element is a lens.

8. The optical sub-system claimed in claim 1, wherein the optical element is a mirror.

9. The optical sub-system claimed in claim 1, wherein the optical element is an acylindric lens.

10. The optical sub-system claimed in claim 1, wherein the optical element is a toric lens.

11. An apparatus for providing a line of illumination comprising:
    a) a light source;
    b) an acylindric optical element having optical power in the direction of the line of illumination to be formed, the acylindric optical element having a plurality of recurring surface tooling marks, the recurring surface tooling marks having a depth of not greater than 0.2 wavelengths of light emitted from the light source; and,
    c) a spatial filter for transmitting non-diffracted light from the output of the acylindric optical element and for blocking at least one order of diffracted light from the output of the acylindric optical element, wherein the diffracted light is caused by the recurring surface tooling marks.

12. The apparatus of claim 11 wherein the light source is a laser.

13. The apparatus of claim 11 further comprising a focusing lens for focusing light directed toward the spatial filter.

14. The apparatus of claim 11 wherein the depth of any tooling mark in the plurality of surface tooling marks is between 0.01 and 0.1 wavelengths of light emitted from the light source.

15. The apparatus claimed in claim 11, wherein the plurality of surface tooling marks are replicated from a mold.

16. The apparatus claimed in claim 11 wherein the acylindric optical element is a lens.

17. The apparatus claimed in claim 11 wherein the acylindric optical element is a mirror.

18. A method for providing an illumination beam comprising:
    a) emitting a source beam from a light source, wherein the source beam has a predetermined wavelength λ;
    b) forming an optical element having a plurality of spaced-apart tooling marks of less than 0.2λ in depth and disposing the optical element in the path of the source beam;
    c) blocking a portion of diffracted orders of light caused by the tooling marks from the output of the optical element; and
    d) passing the undiffracted orders of light to form the illumination beam.

19. A method according to claim 18 wherein the optical element is acylindric.

20. A method according to claim 18 wherein the optical element is a lens.

21. A method according to claim 18 wherein the optical element is a mirror.

22. An image-forming apparatus comprising:
    a) an illumination section comprising
    (i) a light source for providing an incident light beam;
    (ii) an acylindric optical element for spreading the incident light beam along its power direction to provide a linearly spread beam,
    the acylindric optical element having a curved surface featured with a plurality of recurring surface tooling marks, wherein the depth of any surface tooling mark is less than 0.2 wavelengths of the light emitted as the incident light beam,
    whereby a portion of the light is diffracted on the curved surface of the acylindric optical element;
    (iii) a spatial filter for blocking unwanted diffracted light from the linearly spread beam to provide a spatially-filtered illumination beam;
    b) a linear modulator for modulating the spatially-filtered illumination beam, according to image data, and forming a modulated linear beam; and
    c) an imaging lens for directing the modulated linear beam toward a surface, such that an image is formed on the surface.

23. The image-forming apparatus claimed in claim 22 wherein the illumination section further comprises a focusing lens for focusing the linearly spread beam.

24. The image-forming apparatus claimed in claim 22, further comprising a scanning element for scanning the modulated linear beam onto the surface.

25. The image-forming apparatus according to claim 22 wherein the surface is photosensitive.

26. The image-forming apparatus according to claim 22 further comprising a transport mechanism for moving a recording medium along the surface.

27. An image-forming apparatus comprising:
    a) a plurality of color channels, each color channel providing a modulated linear beam and at least one color channel comprising:
    i) an illumination section comprising:
    (1) a light source for providing an incident light beam at a predetermined wavelength;
    (2) an acylindric optical element for spreading the incident light beam along its power direction to provide a linearly spread beam, the acylindric optical element having a curved surface featured with a plurality of recurring surface tooling marks, wherein the depth of any surface tooling mark is less than 0.2 wavelengths of the light emitted as the incident light beam, whereby a portion of the light is diffracted on the curved surface of the acylindric optical element;
    (3) a spatial filter for blocking unwanted diffracted light from the linearly spread beam to provide a spatially-filtered illumination beam;
    ii) a linear modulator for modulating the spatially-filtered illumination beam, according to image data, and forming a modulated linear beam;
    b) a color combiner for combining the modulated linear beam from each of the plurality of color channels to form a composite modulated linear beam; and,
    c) an imaging lens for directing the composite modulated linear beam toward a surface, such that an image is formed on the surface.

* * * * *